(12) United States Patent
Ricci et al.

(10) Patent No.: US 6,615,696 B2
(45) Date of Patent: Sep. 9, 2003

(54) OVAL MANWAY FACING MACHINE

(75) Inventors: Donato L. Ricci, W8477 - 162$^{nd}$ Ave., Hager City, WI (US) 54014; Brent Place, Hager City, WI (US)

(73) Assignee: Donato L. Ricci, Hager City, WI (US)

( * ) Notice: Subject to any disclaimer, the term of this patent is extended or adjusted under 35 U.S.C. 154(b) by 0 days.

(21) Appl. No.: 10/013,076

(22) Filed: Dec. 10, 2001

(65) Prior Publication Data

US 2003/0106397 A1 Jun. 12, 2003

(51) Int. Cl.$^7$ .............................. B23B 5/16; B23B 41/00
(52) U.S. Cl. .............................. 82/113; 82/128; 82/131
(58) Field of Search .......................... 82/113, 128, 130, 82/131, 1.2, 1.3; 30/103, 105, 92

(56) References Cited

U.S. PATENT DOCUMENTS

| | | | | |
|---|---|---|---|---|
| 3,807,047 A | * | 4/1974 | Sherer et al. ................... | 30/97 |
| 4,186,630 A | * | 2/1980 | Lindhag ....................... | 82/113 |
| 4,213,357 A | * | 7/1980 | Lively et al. .................. | 82/113 |
| 4,402,136 A | * | 9/1983 | Rast ............................ | 30/101 |
| 4,939,964 A | * | 7/1990 | Ricci ........................... | 82/113 |
| 5,054,342 A | * | 10/1991 | Swiatowy et al. ............. | 82/113 |
| 5,189,933 A | * | 3/1993 | Ricci ........................... | 82/113 |
| 5,429,021 A | | 7/1995 | Astle et al. | |
| 5,549,024 A | * | 8/1996 | Ricci ........................... | 82/113 |

\* cited by examiner

*Primary Examiner*—Henry W. H. Tsai
(74) *Attorney, Agent, or Firm*—Nikolai & Mersereau, P.A.; Thomas J. Nikolai

(57) ABSTRACT

A machine tool for re-surfacing gasket seats surrounding elliptical openings in oval manways includes a housing of an oval configuration that is adapted to be mounted in the opening of the manway to be machined. A motor and a tool slide assembly are secured to the motor mount in such a fashion that the tool slide assembly is confined to travel in an oval orbit along a second major surface of the housing. A cam actuated feed screw is appropriately disposed to engage a tripper bar disposed in the path of travel to effect radial displacement of a tool holder and tool bit. A cam locking and unlocking control lever cooperates with the cam and is disposed such that an operator located outside of the vessel on which the manway is disposed can readily control the machining operation.

9 Claims, 3 Drawing Sheets

OVAL MANWAY FACING MACHINE

BACKGROUND OF THE INVENTION

I. Field of the Invention

This invention relates generally to portable machining lathes, and more particularly to a machine for re-facing worn, corroded, pitted and leaking gasket seat surfaces of oval manways commonly found on pressurized industrial vessels such as tanks, steamlines, pipelines, etc.

II. Discussion of the Prior Art

Industrial facilities, such as power generating plants, petroleum processing plants and other like facilities have high pressure tanks and pipelines that commonly incorporate sealed entrance ports called manways. Maintenance personnel can use the manways to gain access to the interior of the vessel.

In many instances, these access ports have an oval or elliptical profile. With time, the gasket seat surface between the manway and the vessel may become pitted, corroded and worn to the point where leaks develop. When this happens, it becomes necessary to reface the gasket seat area. To minimize the downtime of the industrial production, it is imperative that the re-facing be accomplished in situ.

One approach for re-facing oval manways in the past has been to use a grinder such as the Oval Manway Seat Grinder commercially available from the D. L. Ricci Corp., the assignee of the present application. This grinder produces a very smooth, fine finish on the manway seat area. However, in some applications, such a smooth surface is disadvantageous. More particularly, in high pressure applications, the gasket used between the manway and the vessel can be extruded radially outwardly due to the high pressures encountered. It is, therefore, desirable in such high pressure applications that the re-surfacing of the gasket seat area result in a slightly ridged surface resembling the somewhat concentric grooves of a phonograph record. This roughened surface has been found to inhibit gasket extrusion even under very high pressures developed within the vessel in question.

It is unduly heavy, making it difficult to set up from a location outside of the vessel. Also, the opening of the oval manway is substantially occluded, making adjustments from outside of the vessel and observation of the surface being machined difficult to do.

SUMMARY OF THE INVENTION

The present invention provides an improved machine for re-surfacing the face of an oval manway gasket seat. It includes a housing having first and second oval-shaped major surfaces having an oval-shaped central opening that is formed through the thickness dimension of the housing. The housing is designed to fit within and be supported by an oval manway to be machined. It has a first track member affixed to the first major surface in surrounding relation to the oval-shaped central opening. Likewise, a second track member is disposed on the second major surface, also in surrounding relation to the central opening. A drive means supported by the housing and cooperating with the first track member causes the drive means to orbit the oval-shaped central opening when the drive means is energized. The drive means carries a bracket member having an arm that extends through the oval-shaped central opening. The arm pivotally supports a link member that is operatively coupled to the second track member and that link member carries a machine tool slide assembly in an orbital path defined by the second track member. The machine tool slide assembly supports a cutting tool for engaging the face of the oval manway.

The machine tool slide assembly comprises a cam actuated feed screw for incrementally translating the cutting tool in a radial direction as the machine tool slide assembly is carried in its orbital path.

Because the central opening of the housing does not become blocked by the tool slide assembly and structure supporting it, an operator, from the outside, can reach through the central opening to make depth-of-cut adjustments and can selectively engage and disengage the cam actuated lead screw that controls the radial translation of the cutting tool. Moreover, because the oval manway is not appreciably blocked or occluded by the facer assembly, the surface being worked can be readily viewed.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several view is referred to corresponding parts.

DESCRIPTION OF THE PREFERRED EMBODIMENT

Figure 1:
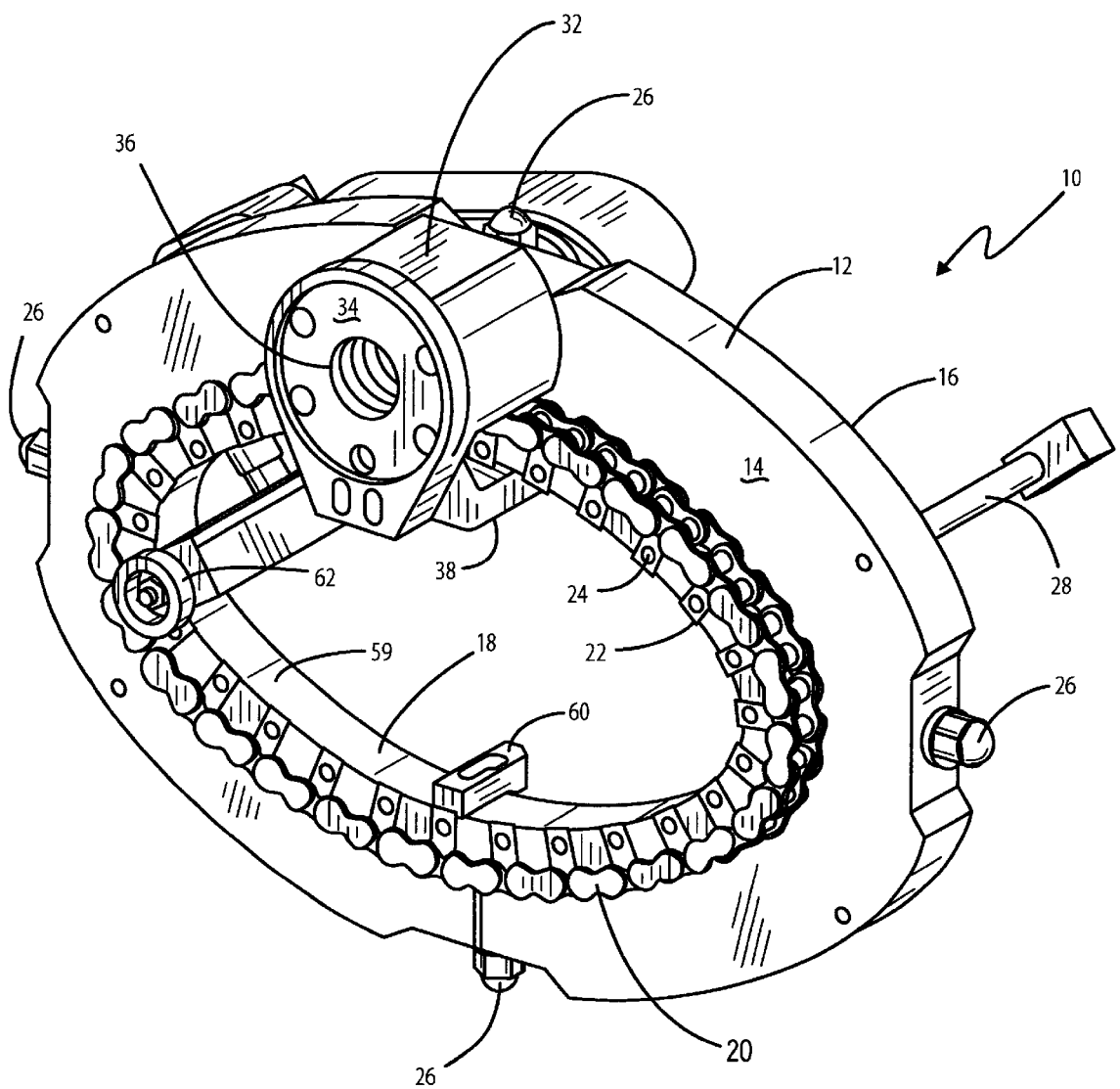
FIG. 1 is a perspective view of the oval manway facer when viewed from the outside of the manway in which the machine is to be installed.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring first to FIG. 1, there is indicated generally by numeral 10 the oval manway facer comprising a preferred embodiment of the present invention. It comprises a housing 12 having a first major surface 14 that is oval-shaped, having its minor access in a vertical direction and its major access in a horizontal direction. The housing 12 has a second major surface 16 best shown in FIG. 2. It too is oval in shape.

Formed centrally through the housing 12 is an oval-shaped opening 18 and bolted to or otherwise affixed to the first major surface 14 in surrounding relation to the central oval opening 18 is an endless chain 20 whose individual links 22 are spaced by a predetermined pitch. In FIG. 1, the chain 20 is shown as being fastened by connectors 22 that are affixed by screws 24 to the outer wall of the housing comprising the first major surface 14.

A plurality of locator jack screws 26 fit into threaded bores formed at the opposed ends of the major and minor axis of the oval-shaped housing 12. During setup, the screws are used to center the manway facer 10 within the oval opening of the manway to be machined. To further facilitate mounting of the oval manway facer machine 10 in the manway, there is provided a plurality of generally L-shaped locator legs, as at 28, that fit into rectangular sockets 30 formed through the second major surface 16 of the housing 12. These locator legs are designed to engage an edge surface of the manway opening to establish the depth of placement and to insure that the facing machine 10 is disposed squarely within the oval manway to be resurfaced.

With continued reference to FIG. 1, there is shown a motor mount 32 having a face 34 to which a pneumatic, hydraulic or electric motor can be bolted and the shaft of the motor (not shown) passes through the central bore 36 and attached to it is a sprocket wheel having gear teeth whose pitch corresponds to the pitch of the chain 20.

Figure 2:
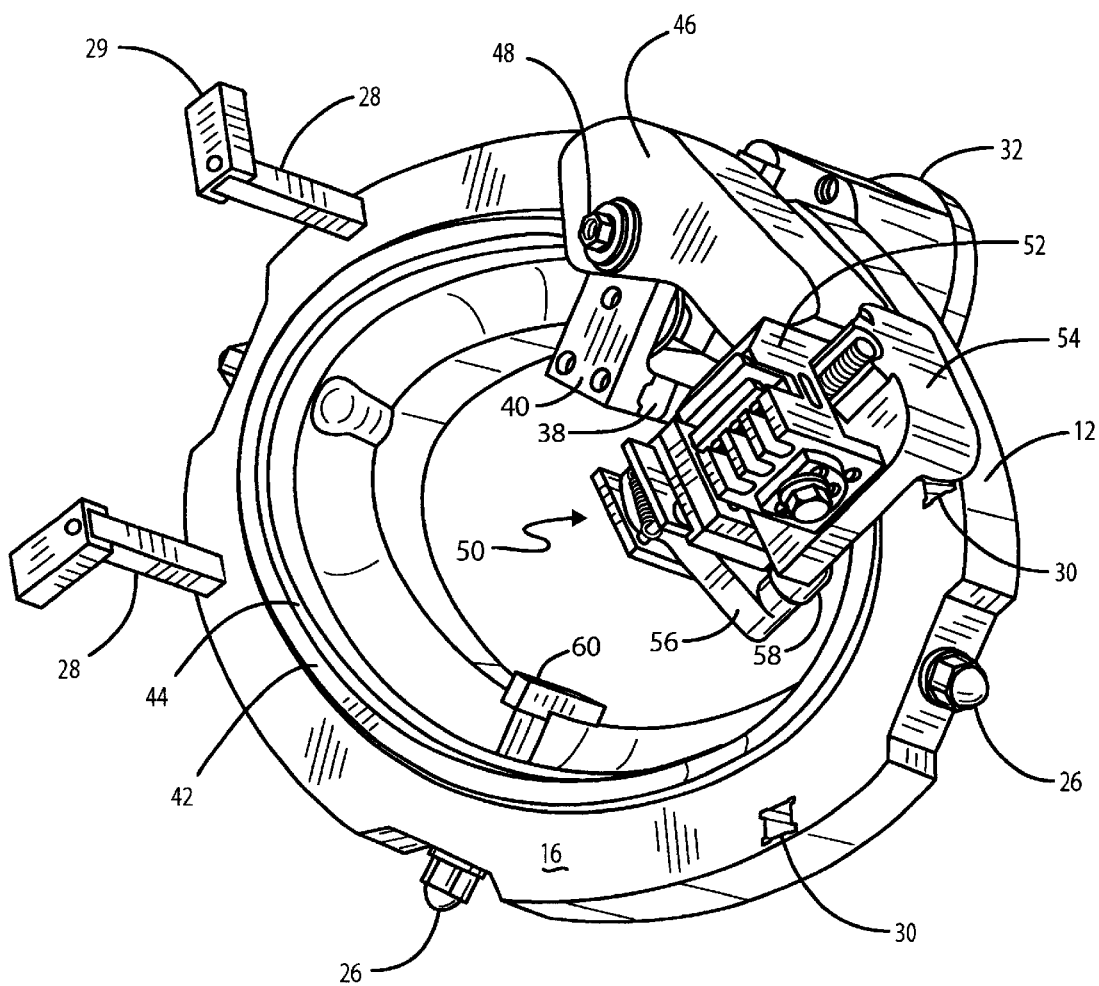
FIG. 2 is a perspective view of the oval manway facer when viewed from the inside of a oval manway.
Figure 3:
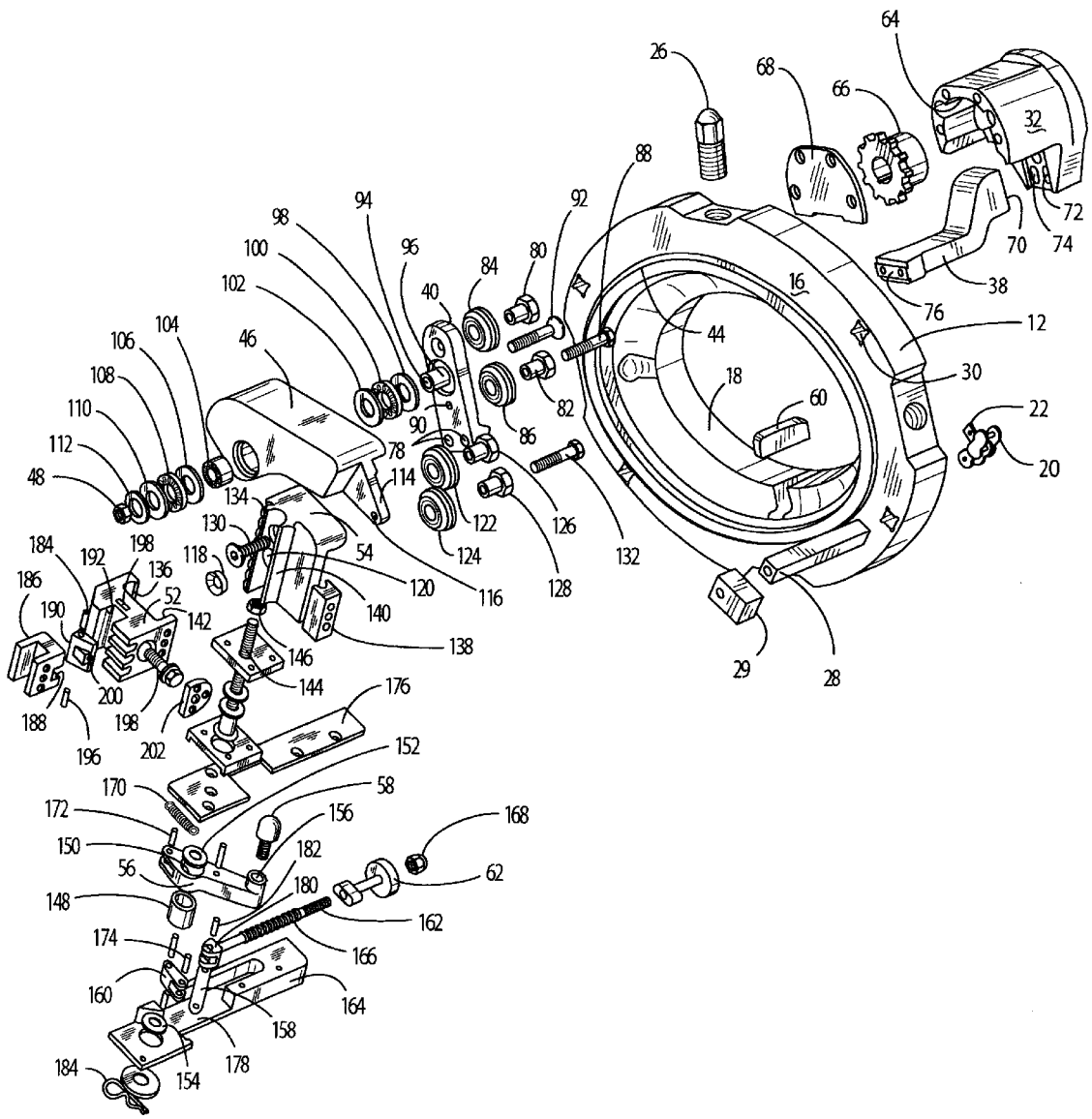
FIG. 3 is an exploded perspective view of the oval manway facer comprising a preferred embodiment of the present invention.

The motor mount 32 carries a support arm 38 that extends through the central opening 18 of the housing 12. As can be seen in the view of FIG. 2, affixed to the free end of the arm 38 carried by the motor mount 32 is a bearing pivot bracket 40. Also visible in the view of FIG. 2 is a second oval track 42 formed on the second major surface 16 and that surrounds the central opening 18. This track is preferably formed in the housing by milling first and second concentric grooves separated by a central ridge 44 therebetween. As will be explained in greater detail when the exploded view of FIG. 3 is described, the bearing pivot bracket 40 secured to the arm 38 carries a pair of Vee-grooved rollers that cooperate with the track 42 to effectively clamp the motor mount 32 with its arm 38 to the housing 12 while allowing the motor mount to orbit the first track defined by the endless chain 20 as the sprocket wheel on the motor's shaft is driven.

With reference again to FIG. 2, pivotally mounted to the bearing pivot bracket 40 is a manway pivot link member 46, the pivot axis being about a bolt on which the nut 48 is fastened.

Affixed to the manway pivot link 46 is a tool slide assembly that includes a tool block 52 that is adapted to slide in the radial direction relative to a slide member 54, which in turn, is pivotally secured to the manway pivot link 46. As will be explained further herein below, a cam member 56 having a roller 58 thereon cooperates with the wall 59 defining the central opening 18 of the housing and operates to incrementally displace the tool block 52 carrying the cutting tool (not shown) in a radial direction each time the roller 58 engages a tripper pin 60 on wall 59 in the course of orbital travel of the roller.

Referring again to FIG. 1, identified by numeral 62 is a manually actuable pull knob that is used to selectively engage and disengage the cam 56 to thereby allow or inhibit axial displacement of the tool block and cutting tool relative to the slide 54. The way in which this is accomplished is described below.

Now that the general construction of the oval manway facer machine of the present invention has been described, consideration will next be given to the details of implementation and, in this regard, reference will be made to the exploded perspective view of FIG. 3. Starting from the right in the drawing and proceeding towards the left, the motor mount 32 is illustrated as having a central, generally semi-circular opening 64 whose diameter accommodates the sprocket 66 which is keyed to the shaft of the drive motor (not shown). A cover plate 68 bolts to the motor mount 32 to enclose the sprocket wheel, except for a portion thereof that extends down below the confines of the motor mount 32 to engage the endless chain 20. The arm 38 has one end 70 thereof fitted into a slot 72 of the motor mount 32 and fastened to it by bolts (not shown) passing through slots as at 74.

When the sprocket 66 is in engagement with the endless chain 20 the free end 76 of the arm 38 extends through the central opening 18 of the housing member 12 and is secured to the bearing pivot bracket 40 by bolts (not shown) passing through the bores 78 formed in the link 40.

Secured to the link 40 by a stationary bushing 80 and a rotatable bushing 82 are Vee bearings 84 and 86, respectively. The bushing 82 is rotatable about a hex bolt 88 that threadingly fits into a threaded bore 90 formed in the bearing pivot bracket 40. The spacing between Vee bearings 84 and 86 is such that they capture the track 44 therebetween.

The manway pivot link 46 is pivotally secured to the bearing pivot bracket 40 using a bolt 92 that passes through a bore 94 formed in a cylindrical stub 96 that is a part of the bracket 40 and, thence, through a thrust washer 98, a thrust bearing 100, another thrust washer 102, needle roller bearing 104, a further thrust washer 106, a thrust bearing 108 and thrust washer 110. This assembly is held in place by a flat washer 112 and the nut 48.

The manway pivot link 46 has a generally triangular ear 114 extending from one end of its body and the ear has a threaded bore 116 for receiving a bolt (not shown) that is made to pass through a slide link bushing 118 that fits into a circular bore 120 formed through the manway facer slide 54, which allows limited pivoting of the slide 54 relative to the pivot link 46.

Affixed to the back surface of the slide 54 is a pair of Vee bearings 122 and 124 that are journaled for rotation by a stationary bushing 126 and a rotatable bushing 128, respectively. The stationary bushing 126 is held in place by a bolt 130 while the rotatable bushing is held by a bolt 132. As with the bearings 84 and 86, the bearings 122 and 124 also engage the track 44 therebetween to constrain the tool slide 54 as it is made to orbit the track as the drive motor drives the sprocket 66 along the chain 20.

The tool slide assembly 50 shown in FIG. 2 comprises the aforementioned tool slide 54 to which is slidingly affixed the tool block 52. Specifically, the tool slide includes a dove-tail projection 134 adapted to fit into a dove-tail groove 136 formed in the tool block 52. A gib 138, also having a Vee groove, is adapted to mate with the dove-tail projection 140 when bolted to the inside of a flange 142 formed on the tool block. This arrangement allows the tool block 52 to move reciprocally relative to the slide block 54. The reciprocal movement is imparted by means of a threaded feed screw 144 that passes through a threaded bore in a feed nut 146 that fits into an appropriately sized opening in the manway facer slide 54.

Rotation is imparted to the lead screw 144 through a Torrington clutch 148 that is captured in the bore 150 of the cam 56 between cam bushings 152 and 154. The Torrington clutch functions as a one-way ratchet on the shaft of the feed screw 144. The cam roller 58 screws into a threaded bore 156 of the cam 56.

Controlling the locked and unlocked state of the cam 56 is a control assembly, including a connector lock link 158 that is pinned to the cam lock 160 used to lock the cam 56. When the cam 56 is locked, the feed screw 144 will not advance the tool in the block 52 radial direction. The other end of the connector lock link 158 is pinned to the push lock rod 162, which slides in a cam top plate 164. A compression spring 166 slides over the push lock rod 162. The cam lock handle 62 slides over the other end of the push lock rod 162 and is held on by the lock nut 168. Pulling the handle 62 and turning it a quarter turn compresses the spring 166 and holds the cam lock 160 away from the cam 56. Turning the handle another quarter of a turn allows the spring 166 to push the cam lock 160 forward, which will lock the cam 56 the next time it is tripped by the tripper pin 60 disposed in the path of travel of the cam roller 58.

A tension spring 170 fits in the clevis end of the cam 56 and is held by a dowel pin 172. Another dowel pin 174 goes through the loop on the other end of the spring 170, the dowel pin 174 being captured between a cam keeper plate 176 and a cam top plate 178. The clevis end of the cam lock 160 is pinned to the connector lock link 158. The opposite end of the connector lock link 158 is pinned to the clevis end 180 of the push lock rod 162 by a dowel pin 182. The spring 170 functions to pull the cam 56 back after it strikes and passes over the tripper pin 60. The cam 56, its clutch 148, along with its bushings 152 and 154 as well as the manually operated cam lock lever assembly are captured between the cam feed bracket 176 and the cam top plate 164 when these two parts are bolted to each other a cotter pin 184 passes through a bore that extends transversely through the bottom of the lead screw 144.

The tool bit is adapted to be captured and held in the tool holder 186. Part 186 has a key way 188 formed in the back surface thereof for receiving a ramp like protrusion on part 190. The part 190 is secured in a cavity 192 of the tool block 52 by means of dowel pins 194 and 196 the ends of which pass through elongated slots in the tool holder 186 as well as through the elongated slots as at 198 on the tool block. A depth-of-cut adjustment screw 198 passes through a bore in the side face of the tool block 52 and into a threaded bore 200 of the ramp member 190. The adjustment screw 198 is captured by a bushing 202 that is bolted to the side surface of the tool block 52. When the hex nut end of the adjustment screw 198 is rotated it moves the wedge member 190 causing displacement of the tool holder 186 along with its cutting bit (not shown).

Having completely described the constructional features of the oval manway facer comprising a preferred embodiment of the present invention, consideration will next be given to its mode of operation.

The assembly shown in FIGS. 1 and 2 is brought to the site and the housing 12 is centered in the oval opening of the manway to be refurbished. The centering jack screws 26 and the legs 28 with the depth stop pads 29 are used to center and align the oval manway facer within the central opening of the manway. A motor (not shown) is bolted to the face 34 of the motor mount 32 and its shaft is keyed to the sprocket wheel 66. When the motor is energized, the sprocket will "walk" around the first track defined by the chain affixed to the first major surface 14 of the housing 12. As the motor and motor mount orbit the oval housing, the arm 38 carrying tool slide assembly 50 also travels in an elliptical, orbital path with the bearing pivot bracket 40 and the manway pivot link 46 constrained to follow the track 44 on the second major surface 16 of the housing 12 by virtue of the fact that the track is clamped between the Vee bearings 84, 86 and 122, 124. As a result, a tool bit clamped in the tool holder 186 also moves in the orbital elliptical path. Upon each revolution of the assembly around the track, the cam roller 58 will strike and pass over the tripper bar 60 mounted on the wall defining the central oval opening 18 of the housing. Depending upon the positioning of the control lever 62, the rotation of the cam 56 upon striking the tripper bar 56 will impart a rotation of the feed screw 144 through a predetermined arc. Rotation of the feed screw, in turn, causes a radial displacement of the tool block 45 along the dove-tail guides on the tool slide 54. The feed rate of the feed screw 144 can be increased by providing more than one tripper bar 60 in the orbital path traversed by the cam roller 58.

As mentioned above, rotation of the height adjustment screw 198 is used to vary the depth-of-cut of the cutting tool with respect to the gasket surface of the manway being machined. This axial adjustment of the tool bit is achieved without need to remount the machine in the manway opening.

In that the cam lock handle 62 extends through the central opening 18 of the housing it is easily accessible to an operator located outside of the vessel on which the manway is disposed. Thus, the radial feed of the cutting tool can be allowed or arrested by the operator. Because of the open central portion of the machine, the operation can readily inspect the surface as it is being machined so that less rework is required.

While the invention has been described in detail, it is to be understood that various changes and modifications may be made therein without departing from the spirit and scope of the invention, as defined in the appended claims.

What is claimed is:

1. Apparatus for machining the face of an oval manway, comprising:
   a) a housing having first and second oval-shaped major surfaces and defining an oval-shaped central opening formed therethrough, the housing adapted to fit within an oval manway to be machined;
   b) a first track member affixed to the first major surface in surrounding relation to the oval-shaped central opening;
   c) a second track member on the second major surface in surrounding relation to the central opening;
   d) drive means supported by the housing and cooperating with the first track member so that when the drive means is energized, the drive means orbits the oval-shaped central opening following the first track;
   e) a bracket member carried by the drive means, the bracket comprising an arm extending through the oval-shaped central opening, said arm pivotably supporting a link member that is operatively coupled to the second track member; and
   f) a machine tool slide assembly joined to the link member to be carried thereby in an orbital path defined by the second track member and carrying a cutting tool for engaging the face of the oval manway.

2. The apparatus of claim 1 wherein the first track member comprises an endless chain comprising a plurality of interconnected chain links affixed to the first major surface of the housing.

3. The apparatus of claim 2 wherein the drive means comprises a motor having a sprocket wheel on an output shaft thereof, the sprocket wheel engaging the endless chain.

4. The apparatus of claim 1 wherein the link member is operatively coupled to the second track member by bearings rotatably journaled to the link member and siding on the second track member.

5. The apparatus as in claim 1 wherein the machine tool slide assembly comprises means for incrementally translating the cutting tool in a radial direction as the machine tool slide assembly is carried in said orbital path.

6. The apparatus of claim 5 and further including a manually actuatable control device on the tool slide assembly accessible to an operator located outside of the manway being machined, for selectively prohibiting or allowing the incremental translation of the cutting tool.

7. The apparatus of claim 5 wherein the machine tool slide assembly includes a depth-of-cut adjustment member.

8. Apparatus for machining the face of an oval manway comprising:
   a) a housing having first and second oval-shaped major surface and oval-shaped central opening formed therethrough, the housing adapted to fit within an oval manway to be machined;
   b) an endless chain comprising a plurality of interconnected chain links affixed to the first major surface of the housing in surrounding relation to the central opening;

c) a track on the second major surface in surrounding relation to the central opening;

d) a motor mount adapted to support a motor with an output shaft having a sprocket thereon whose pitch conforms to that of the chain links on the endless chain and having an arm extending through the central opening;

e) a pivotable link connected to the arm of the motor mount and including roller members for engaging the track on the second major surface; and f) a machine tool slide assembly pivotally joined to the pivotable link and including means for incrementally translating a cutting tool in a radial direction as the motor drives the sprocket, allowing the motor mount member, the pivotable link and the machine tool slide assembly to orbit about the central opening.

9. The machining apparatus of claim 8 wherein the machine tool slide assembly comprises:

a) a slide housing with a lead screw journaled for rotation therein;

b) a tool block slidingly coupled to the slide housing;

c) a traveling nut threaded onto the lead screw and engaging the tool block; and d) a cam coupled to the lead screw and cooperating with a projection on the housing for imparting rotation of the lead screw and said incremental translation of the cutting tool upon engagement of the cam with the projection as the tool slide assembly orbits about the central opening.

* * * * *